Nov. 11, 1969   W. J. WOSTL   3,477,277
APPARATUS FOR CONTINUOUSLY DETERMINING THE ADIABATIC
BULK MODULUS OF A LIQUID WITHIN A PIPELINE
Filed Nov. 30, 1967   2 Sheets-Sheet 1

INVENTOR
Wolfgang J. Wostl

BY McLean, Morton & Boustead
ATTORNEYS

INVENTOR
Wolfgang J. Wostl

United States Patent Office 3,477,277
Patented Nov. 11, 1969

3,477,277
APPARATUS FOR CONTINUOUSLY DETERMINING THE ADIABATIC BULK MODULUS OF A LIQUID WITHIN A PIPELINE
Wolfgang J. Wostl, South Holland, Ill., assignor to Sinclair Research, Inc., New York, N.Y., a corporation of Delaware
Filed Nov. 30, 1967, Ser. No. 686,925
Int. Cl. G01n 11/00, 9/00
U.S. Cl. 73—53       11 Claims

ABSTRACT OF THE DISCLOSURE

Apparatus for measuring the adiabatic bulk modulus $B_s = Kdv^2$ of a liquid within a pipeline, wherein $K$ is a constant, $d$ is the density of the liquid, and $v$ is the velocity of sound within the liquid. A velocimeter within the pipeline measures the velocity of sound in the liquid. A gravitometer measures the density of a sample of the liquid temporarily diverted from the pipeline. Temperature and pressure sensors and control circuits insure that the sample temperature and pressure are the same as the temperature and pressure within the pipeline.

---

This invention relates to an apparatus for determining the bulk modulus of a liquid. More particularly, this invention pertains to an apparatus for continuously determining the adiabatic bulk modulus of a liquid within a pipeline.

The adiabatic bulk modulus of a liquid is of importance during the operation of a liquid distribution system such as a pipeline. Using it, it is possible to determine the effect of hydraulic phenomena within the distribution system such as pressure surges, water hammers, etc. The adiabatic bulk modulus of a liquid can be defined by the following equation:

$$B_s = Kdv^2$$

wherein $B_s$ is the adiabatic bulk modulus, $K$ is a constant including the acceleration of gravity, $d$ is the density of the liquid, and $v$ is the velocity of sound in the liquid.

Considerable effort has been expended by hydraulic engineers in recent years in fabricating devices to determine quickly and easily the bulk modulus of liquids within pipelines. While a number of bulk modulus measuring devices have been produced, all such devices operate completely external to the pipeline system, and so they require the removal of a sample of the transported liquid into the external measuring device to permit density and sound velocity measurements to be made. Because both the density of a liquid and the velocity of sound within a liquid fluctuate with variation in either temperature or pressure, it becomes extremely important during utilization of density or sound velocity measuring devices to maintain both the temperature and the pressure of the sample under extremely rigid tolerances. As a consequence, commercially available equipment normally does not provide the required accuracy.

Much work is being done to develop computer systems to automatically control flow of materials within pipelines. The inherent delay involved in the use of external density and sound velocity measuring devices prevents such apparatus from being utilized in computerized pipeline operations where the bulk modulus of the flowing liquid must be instantaneously known. Because of the speed required for computerized operation, it is extremely advantageous to measure the bulk modulus of the transported liquid directly in the pipeline. Additionally, measurement within the pipeline provides more accurate data.

The present invention is an apparatus for continuously determining the adiabatic bulk modulus of liquid flowing within a pipeline. A thermal sensing device and a pressure sensing device within the pipeline provide signals which are utilized to regulate the temperature and pressure of a sample of the pipeline liquid which has been diverted into a gravitometer. The gravitometer produces an output signal proportional to the density of the liquid flowing in the pipeline. A velocimeter within the pipeline provides a signal indicative of the velocity of sound within liquid in the pipeline. The density signal and the sound velocity signal are then combined, together with an appropriate multiplying constant, to provide a signal indicative of the bulk modulus of the liquid within the pipeline.

The gravitometer is supplied with liquid shunted from the pipeline. The temperature and pressure of this liquid sample are brought to the same values as the temperature and pressure of the liquid within the pipeline itself. As a result, the density of the liquid sample is the same as the density of the pipeline liquid. Thus, the gravitometer output signal is indicative of the density of the pipeline liquid.

These and other aspects and advantages of the present invention are more apparent in the following detailed description and claims, particularly when taken in conjunction with the accompanying drawings in which like parts bear like reference numerals.

Figure 1:
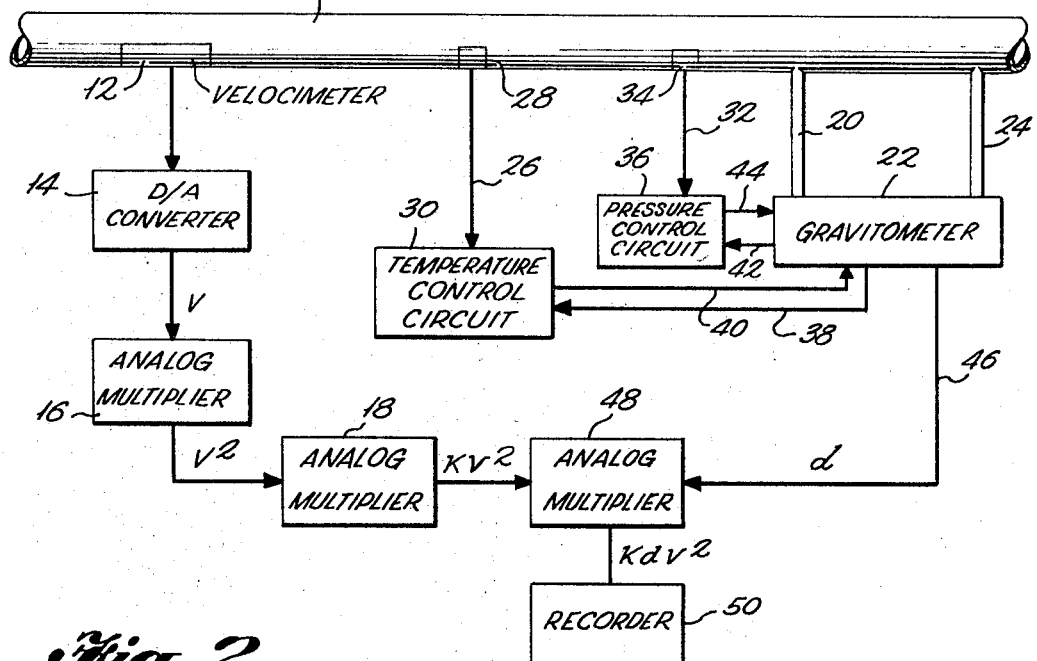
FIGURE 1 is a diagrammatic representation of the adiabatic bulk modulus monitoring apparatus of the present invention.

Within pipeline 10, depicted in FIGURE 1, a velocimeter 12 measures the velocity of sound in the liquid transported within the pipeline. Velocimeter 12 provides a digital indication of this sound velocity to digital-to-analog converter 14 which applies an analog sound velocity signal $v$ to analog multiplier 16. The output of multiplier 16 is $v^2$, the square of the velocity of sound within the liquid in pipeline 10. This $v^2$ signal is provided as an input to analog multiplier 18 which multiplies it by the appropriate constant K, giving an output from multiplier 18 of $Kv^2$. The constant K includes the acceleration of gravity and other necessary factors for determination of the adiabatic bulk modulus, as is well known in the art. Analog multipliers 16 and 18 could be combined into a single unit but are shown as separate units in FIGURE 1 in the interests of clarity.

An inlet pipe 20 diverts a small sample of the liquid flowing in pipeline 10 to gravitometer 22. After passing through gravitometer 22 this sample is returned to pipeline 10 via outlet pipe 24. Via line 26 a temperature sensor 28 provides an indication of the temperature of the liquid in pipeline 10 to temperature control circuit 30. Likewise, via line 32 a pressure sensor 34 provides an indication of the pressure within pipeline 10 to pressure control circuit 36. Via line 38 temperature control circuit 30 is provided with an indication of the temperature within the sample of the pipeline liquid in gravitometer 22, and temperature control circuit 30 provides temperature control signals to gravitometer 22 via line 40. Similarly, pressure control circuit 36 receives via line 42 indications of the pressure within the pipeline liquid sample in gravitometer 22 and provides pressure control signals to the gravitometer via line 44. Thus, the temperature and the pressure of the sample of pipeline liquid within gravitometer 22 are maintained the same as the temperature and the pressure of the liquid within pipeline 10.

Gravitometer 22 determines the density of the pipeline liquid sample and provides on its output line 46 a signal $d$ indicative of this density. Since the temperature and pressure of the sample are the same as the temperature and pressure of the liquid within pipeline 10, and since the sample is obtained by diverting liquid from pipeline 10, this signal $d$ is indicative of the density of the liquid transported within pipeline 10.

Gravitometer output line 46 applies the density signal $d$ to one input of analog multiplier 48 which receives at its other input the $Kv^2$ signal from analog multiplier 18. The output of multiplier 48 is thus the signal $Kdv^2$ which equals the adiabatic bulk modulus $B_s$ of the liquid in pipeline 10. This bulk modulus signal is applied by multiplier 48 to suitable recording and indicating equipment 50.

Figure 2:
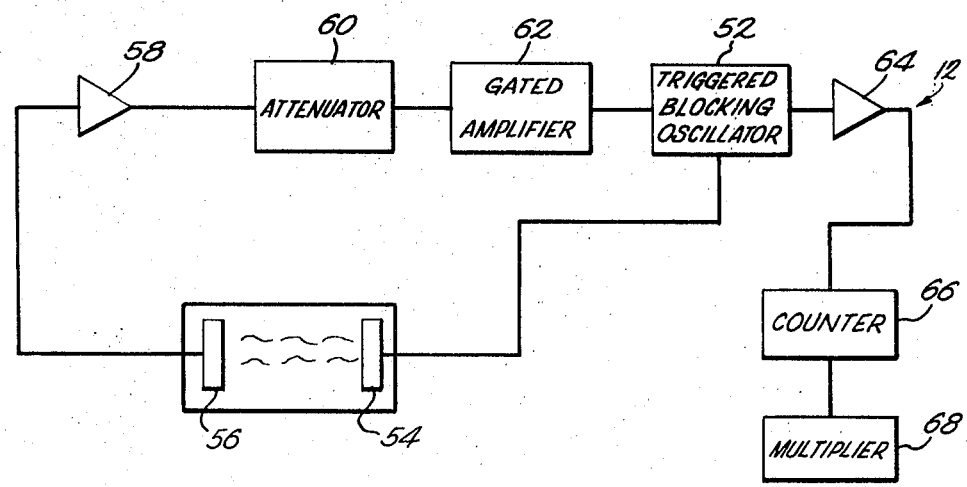
FIGURE 2 is a block diagram of a velocimeter suitable for use in the present invention.

FIGURE 2 depicts a velocimeter suitable for use as velocimeter 12. A triggered blocking oscillator 52 applies a short pulse to transmitting electroacoustic transducer 54 which is located within the liquid in pipeline 10. As a result transducer 54 emits a pulse of acoustic energy which travels through the pipeline liquid to receiving electroacoustic transducer 56, also located within the pipeline liquid at a known distance from transmitting transducer 54. Transducer 56 converts the received acoustic pulse to an electrical pulse which is applied to amplifier 58. The output of amplifier 58 passes through attenuator 60 to gated amplifier 62 which again triggers blocking oscillator 52 to apply another pulse to transmitting transducer 54. Attenuator 60 is included to accommodate liquids having varying degrees of sound attenuation.

Thus, an energy pulse continuously cycles from blocking oscillator 52, through transducers 54 and 56, amplifier 58, attenuator 60, and gated amplifier 62 and back to oscillator 52. The time interval between pulses from blocking oscillator 52 is almost entirely dependent upon the travel time of the acoustic energy passing from transducer 54 to transducer 56. The travel time of this acoustic energy is in the millisecond range, while the travel time of the electrical energy through the electronic components in the system is in the order of a fraction of a microsecond, being dependent upon characteristics of the electrical components involved. This ratio of better than 1,000 to 1 makes the electrical delay negligible.

Each time blocking oscillator 52 generates a pulse, a signal is applied from the oscillator through amplifier 64 to counter 66 which counts the pulses. By counting the pulses over a fixed period of time, for example, one second, the frequency at which the energy pulses cycle around the velocimeter is determined. Counter 66 includes timing and gating circuitry so that during the one second time interval when the pulses from amplifier 64 are being counted in the counter, the output of the counter remains at the previous count level until a new frequency signal has been obtained. This insures that there is always a signal applied to multiplier 68. By way of example, counter 66 might be a Beckman/Berkeley Eput meter having appropriate timing and gating circuitry.

The pulse count signal from counter 66 is applied to multiplier 68 which multiplies it by the length of the acoustic path between transmitting transducer 54 and receiving transducer 56 to give the acoustic velocity within the liquid in pipeline 10. The acoustic velocity signal from multiplier 68 is the output of velocimeter 12 which is applied to digital-to-analog converter 14.

Figure 3:
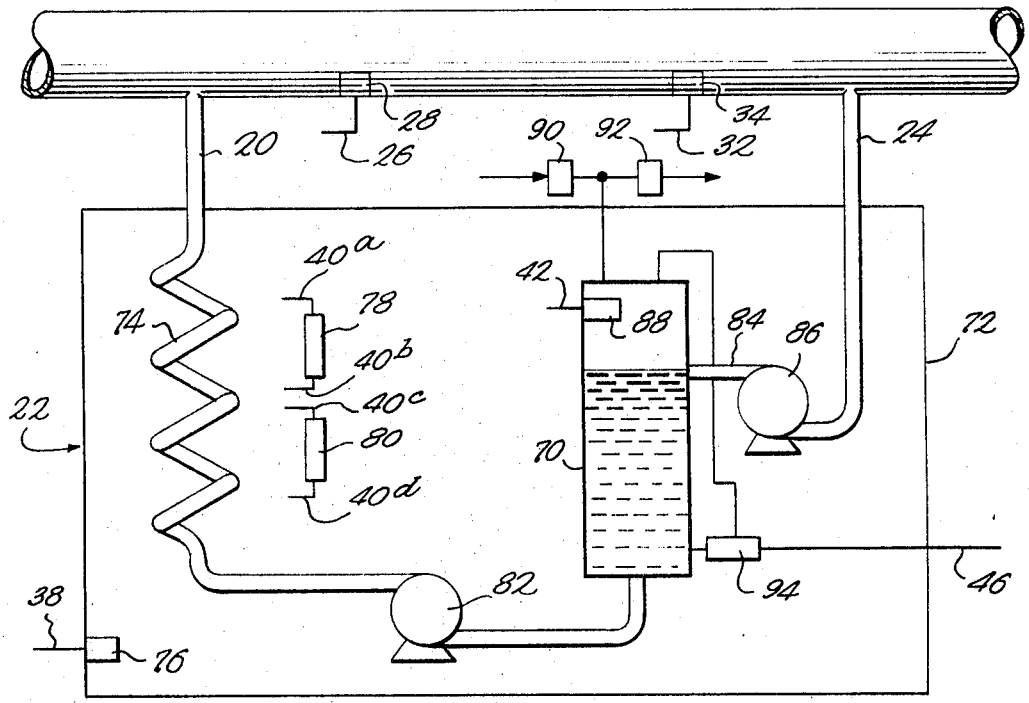
FIGURE 3 is a diagrammatic representation of a gravitometer suitable for use in the present invention.

Gravitometer 22 is shown in detail in FIGURE 3. Measuring column 70 is enclosed in an oil bath 72 to insure that the liquid sample is at thermal equilibrium. Inlet pipe 20 diverts liquid from pipeline 10 to coiled pipe 74 through which the liquid sample passes to bring it to the temperature of oil bath 72. A temperature sensor 76 monitors the temperature of oil bath 72, and thus of the liquid sample, and provides a temperature indication via line 38 to temperature control circuit 30. Temperature control elements 78 and 80 are connected by lines 40a, 40b, 40c, and 40d (which make up line 40) to temperature control circuit 30. If the signals from temperature sensors 28 and 76 indicate that the temperature of the liquid in pipeline 10 is higher than the temperature of the liquid sample in gravitometer 22, then temperature control circuit 30 applies a signal via lines 40a and 40b to temperature control element 78 which heats the oil bath 72 to raise the temperature of the liquid sample. However, if the temperature sensors indicate that the temperature of the liquid within pipeline 10 is lower than the temperature of the liquid sample, then temperature control circuit 38 applies a signal via lines 40c and 40d to temperature control element 80 which cools the oil bath 22 to lower the temperature of the liquid sample. Preferably, a motor-driven propeller (not shown) stirs the oil within bath 22 to insure thermal equilibrium.

The liquid sample within pipe coils 74 is pumped by pump 82 into the bottom of measuring column 70 which is a closed cylindrical chamber. The liquid sample within measuring column 70 rises to the level of outlet 84 from which it is pumped through outlet pipe 24 by pump 86 to return it to pipeline 10. Gas fills measuring column 70 above the level of the liquid sample. A pressure sensor 88 near the top of column 70 monitors the pressure at the top of the liquid within the column 70. Pressure sensor 88 provides a pressure indication via line 42 to pressure control circuit 36 which also receives via line 32 an indication from pressure sensor 34 of the pressure within pipeline 10. If signals from pressure sensors 34 and 88 indicate that the pressure within pipeline 10 is greater than the pressure within measuring column 70, then pressure control circuit 36 applies a signal via line 44 to means such as a solenoid (not shown) to open valve 90 to introduce more gas into column 70, thereby raising the pressure on the liquid sample. Alternatively, if the pressure sensors 34 and 88 indicate that the pressure within pipeline 10 is lower than the pressure on the liquid sample, then pressure control circuit 36 applies a signal via line 44 to means such as another solenoid (not shown) which opens valves 92 to vent gas from column 70 to reduce the pressure on the sample.

Differential pressure sensor 94 is coupled to the top of column 70 and to the bottom of column 70 to measure the pressure differential across the column of liquid within chamber 70. The pressure on the liquid column caused by the gas introduced via valve 90 is transmitted by the column. Thus the differential pressure measurement is made at the same temperature and pressure as are found in the liquid within pipeline 10. Since the volume and the cross-sectional area of the liquid within measuring column 70 are known, the output of differential pressure sensor 94 is indicative of the density of the liquid within column 70 and thus of the density of the liquid in pipeline 10. This density indication $d$ is applied via line 46 to analog multiplier 48 to be utilized in determining the adiabatic bulk modulus.

Figure 4:
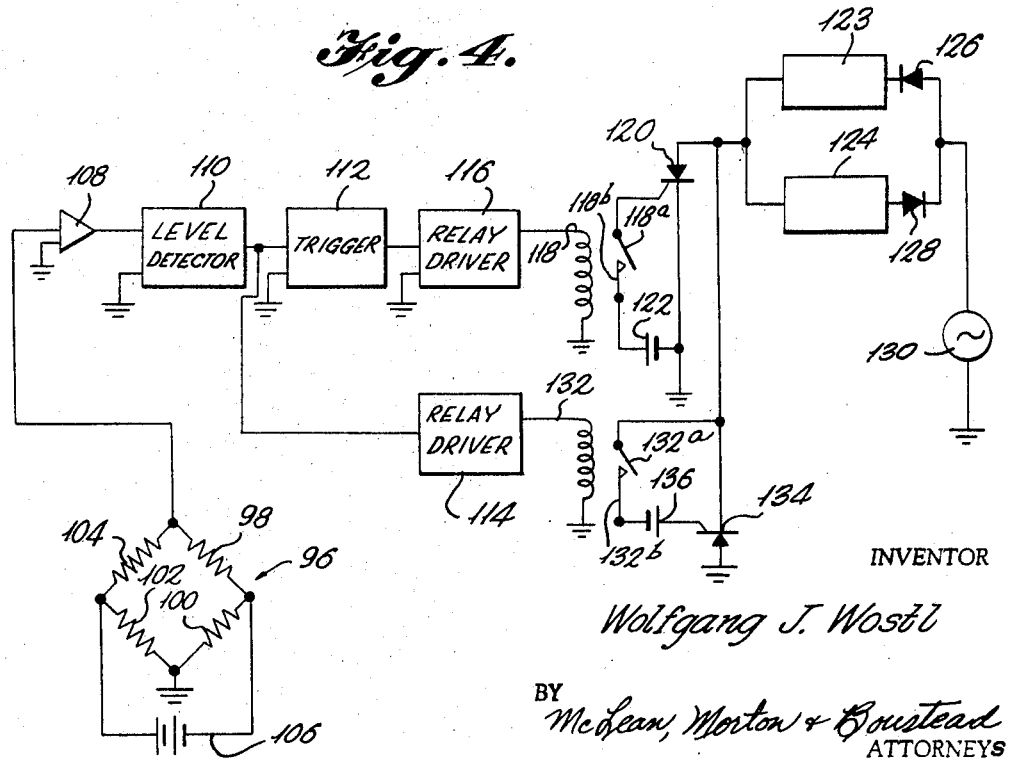
FIGURE 4 is a block diagram of the control circuitry utilized in the gravitometer of FIGURE 3.

A control circuit suitable for use as temperature control circuit 30 and as pressure control circuit 36 is depicted in FIGURE 4. Wheatstone bridge circuit 96 includes fixed resistors 98 and 100 and condition sensitive resistors 102 and 104. The junction of resistors 98 and 100 is connected to one side of battery 106 which has its other side tied to the junction of resistors 102 and 104. The junction of resistors 100 and 102 is tied to ground, while the junction of resistors 98 and 104 is connected to the input of amplifier 108. The output of amplifier 108 is tied to one input of level detector 110 which has its second input connected to ground.

For temperature control circuit 30, condition sensitive resistor 102 is temperature sensor 28 within pipeline 10, while condition sensitive resistor 104 is temperature sensor 76 within gravitometer 22. When the temperature within pipeline 10 and the temperature within gravitometer 22 are equal, bridge 96 is balanced, and a ground level input is applied through amplifier 108 to level detector 110. As a consequence the level detector 110 output is insufficient to activate either trigger circuit 112 or relay driver 114, both of which are connected to the output of level detector 110. If resistors 102 and 104 have positive temperature coefficients, then whenever the temperature within pipeline 10 exceeds the temperature in gravitometer 22, the resistance of resistor 102 exceeds the resistance of resistor 104. This temperature imbalance may be either due to the temperature in pipeline 10 rising to increase the resistance of resistor 102 or due to the temperature in gravitometer 22 falling to decrease the resistance of resistor 104. In such a case the voltage at the junction of resistors 98 and 104 increases. This increased voltage is applied through amplifier 108 to level detector 110 which applies a signal to trigger circuit 112 and relay driver 114. This positive signal from level detector 110 does not affect relay driver 114, but it fires trigger circuit 112 to activate relay driver 116. As a consequence, relay 118 is energized to close its moving contact 118a against its stationary contact 118b.

Contact 118a is tied to the gate of silicon controlled rectifier (SCR) 120, while contact 118b is connected to the positive terminal of a voltage source such as battery 122 which has its negative terminal tied to the cathode of SCR 120 and to ground. The anode of SCR 120 is tied to one side of condition control means 123 and to one side of condition control means 124. The second side of condition control means 123 is connected to the cathode of diode 126, while the second side of condition control means 124 is connected to the anode of diode 128. The anode of diode 126 is tied to the cathode of diode 128, and this junction is connected to a source 130 of alternating voltage, referenced to ground.

When relay 118 is energized, voltage source 122 applies a positive gate-to-cathode potential to SCR 120, making the SCR conductive. During each positive half-cycle of voltage from alternating source 130, current flows from source 130, through diode 126, condition control means 123, and SCR 120 to ground. Where the circuit of FIGURE 4 is utilized for temperature control circuit 30, condition control means 123 is temperature control element 78 which heats oil bath 72 within gravitometer 22. Thus, the temperature of the liquid sample in gravitometer 22 is raised until bridge circuit 96 is again balanced, deenergizing relay 118. Opening of relay contacts 118a and 118b removes the positive gate-to-cathode potential from SCR 120. During the next negative half-cycle of voltage from source 130 no current flows through SCR 120, and the SCR returns to its non-conductive condition.

When the temperature within pipeline 10 is lower than the temperature in gravitometer 22, the resistance of resistor 104 exceeds the resistance of resistor 102. This might be either due to the temperature within pipeline 10 dropping or the temperature within gravitometer 22 rising. In either case, the unbalance of Wheatstone bridge 96 causes a negative potential to be applied through amplifier 108 to level detector 110 which then applies a negative signal to trigger circuit 112 and to relay driver 114. This negative signal does not affect trigger circuit 112, but it activates relay driver 114 to energize relay 132, closing moving contact 132a against fixed contact 132b. Contact 132a is connected to the cathode of SCR 134 which has its anode grounded. Contact 132b is tied to the negative terminal of a voltage source such as battery 136 which has its positive terminal connected to the gate of SCR 134. The cathode of SCR 134 is also connected to the junction of condition control means 123 and condition control means 124.

When relay 132 is energized, battery 136 places a positive potential on the gate-to-cathode circuit of SCR 134, causing that SCR to become conductive. Then, during each negative half cycle of voltage from alternating source 130, current flows through SCR 134, condition control means 124, diode 128 and source 130. For temperature control circuit 30, condition control means 124 is temperature control element 80 which cools oil bath 72 within gravitometer 22. Thus, the temperature of the liquid sample in gravitometer 22 is lowered until bridge circuit 96 is again balanced, de-energizing relay 132. During the next positive half cycle of voltage from alternating source 130, no current flows through SCR 134, and that SCR returns to its non-conductive condition.

For pressure control circuit 36, resistor 102 is pressure sensor 34, resistor 104 is pressure sensor 88, condition control means 123 is the solenoid which controls gas inlet valve 90, and condition control means 124 is the solenoid which controls gas outlet valve 92. Consequently, when the pressure within pipeline 10 exceeds the pressure in measuring column 70, the unbalance of Wheatstone bridge 96 causes the activation of the solenoid controlling valve 90 to bring more gas into column 70, thereby raising the pressure within the column. Similarly, when the pressure in pipeline 10 is less than the pressure in column 70, the solenoid controlling outlet valve 92 is energized, and gas is released from column 70 to lower its pressure. Thus, the pressure and temperature conditions within gravitometer 22 are kept the same as the pressure and temperature conditions within pipeline 10.

Although the present invention has been described with reference to a preferred embodiment, obviously numerous modifications could be made and still the resulting apparatus would be within the scope of the invention. By design optimization certain components might be combined or eliminated, but they have been shown in the interest of clarity.

What is claimed is:

1. Apparatus for measuring the adiabatic bulk modulus $B_s = Kdv^2$ of a liquid within a pipeline wherein $k$ is a constant including the acceleration of gravity, $d$ is the density of the liquid, and $v$ is the velocity of sound within the liquid, said apparatus comprising first means within said pipeline for measuring the velocity of sound within said liquid and for providing a signal $v$ indicative of said measured velocity, multiplication means for generating a signal $Kv^2$ from said measured velocity signal, second means within said pipeline for monitoring the temperature of said liquid, third means for monitoring the pressure within said pipeline, gravitometer means for measuring the density of said liquid and for providing a signal $d$ indicative of said measured density, fourth means coupled to said second means and to said gravitometer means for maintaining the temperature within said gravitometer means at substantially the same temperature as the temperature of said liquid within said pipeline, fifth means coupled to said third means and to said gravitometer means for maintaining the pressure within said gravitometer means at substantially the same pressure as the pressure within said pipeline, and further multiplication means coupled to said first-named multiplication means and to said gravitometer means for generating a signal $B_s = Kvd^2$ from said signal $Kv^2$ and from said measured density signal.

2. Apparatus as claimed in claim 1 further including means for indicating said $B_s$ signal.

3. Apparatus as claimed in claim 1 in which said first means includes:

(a) a triggered blocking oscillator having an output coupled to a first electroacoustic transducer and an input coupled to a second electroacoustic transducer, said transducers located within said pipeline a known distance apart, whereby each output pulse from said oscillator causes said first transducer to transmit acoustic pulse energy through said liquid to said second transducer and each acoustic pulse received by said second transducer causes a triggering pulse to be applied to said oscillator;

(b) means for determining the frequency of output pulses from said oscillator; and (c) means for multiplying the output pulse frequency by the distance between said transducers to provide said measured velocity signal $v$.

4. Apparatus as claimed in claim 1 in which said gravitometer means includes:

(a) a closed cylindrical measuring column immersed in an oil bath;

(b) means hydraulically coupling said measuring column with said pipeline; and (c) means for measuring the pressure difference between the top and bottom of said measuring column.

5. Apparatus as claimed in claim 4 in which said fourth means includes:

(a) rectifier means controlled by a Wheatstone bridge circuit including said second means; and (b) temperature control means within said oil bath for controlling the temperature of said oil bath under the control of said rectifier means.

6. Apparatus as claimed in claim 5 in which said fifth means includes:

(a) rectifier means controlled by a Wheatstone bridge circuit including said third means; and (b) gas control means for controlling the pressure within said measuring column under the control of said rectifier means.

7. Apparatus as claimed in claim 6 in which said first means includes:

(a) a triggered blocking oscillator having an output coupled to a first electroacoustic transducer and an input coupled to a second electroacoustic transducer, said transducers located within said pipeline a known distance apart, whereby each output pulse from said oscillator causes said first transducer to transmit acoustic pulse energy through said liquid to said second transducer and each acoustic pulse received by said second transducer causes a triggering pulse to be applied to said oscillator;

(b) means for determining the frequency of output pulses from said oscillator; and (c) means for multiplying the output pulse frequency by the distance between said transducer to provide said measured velocity signal $v$.

8. Apparatus as claimed in claim 5 in which said first means includes:

(a) a triggered blocking oscillator having an output coupled to a first electroacoustic transducer and an input coupled to a second electroacoustic transducer, said transducers located within said pipeline a known distance apart, whereby each output pulse from said oscillator causes said first transducer to transmit acoustic pulse energy through said liquid to said second transducer and each acoustic pulse received by said second transducer causes a triggering pulse to be applied to said oscillator;

(b) means for determining the frequency of output pulses from said oscillator; and (c) means for multiplying the output pulse frequency by the distance between said transducers to provide said measured velocity signal $v$.

9. Apparatus as claimed in claim 4 in which said fifth means includes:

(a) rectifier means controlled by a Wheatstone bridge circuit including said third means; and (b) gas control means for controlling the pressure within said measuring column under the control of said rectifier means.

10. Apparatus as claimed in claim 6 in which said first means includes:

(a) a triggered blocking oscillator having an output coupled to a first electroacoustic transducer and an input coupled to a second electroacoustic transducer, said transducers located within said pipeline a known distance apart, whereby each output pulse from said oscillator causes said first transducer to transmit acoustic pulse energy through said liquid to said second transducer and each acoustic pulse received by said second transducer causes a triggering pulse to be applied to said oscillator;

(b) means for determining the frequency of output pulses from said oscillator; and (c) means for multiplying the output pulse frequency by the distance between said transducers to provide said measured velocity signal $v$.

11. Apparatus as claimed in claim 4 in which said first means includes:

(a) a triggered blocking oscillator having an output coupled to a first electroacoustic transducer and an input coupled to a second electroacoustic transducer, said transducers located within said pipeline a known distance apart, whereby each output pulse from said oscillator causes said first transducer to transmit acoustic pulse energy through said liquid to said second transducer and each acoustic pulse received by said second transducer causes a triggering pulse to be applied to said oscillator;

(b) means for determining the frequency of output pulses from said oscillator; and (c) means for multiplying the output pulse frequency by the distance between said transducers to provide said measured velocity signal $v$.

References Cited

UNITED STATES PATENTS

| 2,641,127 | 6/1953 | Kerr et al. | 73—53 |
| 2,880,611 | 4/1959 | Herren | 73—53 |
| 3,256,741 | 6/1966 | Wise | 73—432 |

OTHER REFERENCES

Wostl, W. J., Buehl, R. J., Dresser, T., Apparatus for Measurement of Bulk Modulus, in Review of Scientific Instruments, 37(12), pp. 1665–1669. December 1966.

LOUIS R. PRINCE, Primary Examiner

JOSEPH W. ROSKOS, Assistant Examiner

U.S. Cl. X.R.

73—32

PO-1050
(5/69)

UNITED STATES PATENT OFFICE
CERTIFICATE OF CORRECTION

Patent No. 3,477,277                     Dated November 11, 1969

Inventor(s) Wolfgang J. Wostl

It is certified that error appears in the above-identified patent and that said Letters Patent are hereby corrected as shown below:

Column 6, Line 59, delete "$Kvd^2$", and insert therefor --$Kdv^2$--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents